US012674814B2

(12) United States Patent
  Weiss et al.

(10) Patent No.:  US 12,674,814 B2
(45) Date of Patent:  Jul. 7, 2026

(54) METHOD AND AEROSOL MEASURING DEVICE FOR DETERMINING THE PARTICLE VELOCITY OF AN AEROSOL

(71) Applicant: Palas GmbH Partikel- und Lasermesstechnik, Karlsruhe (DE)

(72) Inventors: Maximilian Weiss, Weingarten (DE); Frederik Weis, Herxheim (DE); Sebastian Kohler, Oberhausen-Rheinhausen (DE)

(73) Assignee: Palas GmbH, Karlsruhe (DE)

( * ) Notice: Subject to any disclaimer, the term of this patent is extended or adjusted under 35 U.S.C. 154(b) by 958 days.

(21) Appl. No.: 17/950,796

(22) Filed: Sep. 22, 2022

(65) Prior Publication Data
  US 2023/0021225 A1      Jan. 19, 2023

Related U.S. Application Data

(63) Continuation of application No. PCT/EP2021/057184, filed on Mar. 22, 2021.

(30) Foreign Application Priority Data
  Mar. 23, 2020    (DE) ..................... 10 2020 001 876.9

(51) Int. Cl.
  *G01P 5/26*            (2006.01)
(52) U.S. Cl.
  CPC ...................................... *G01P 5/26* (2013.01)
(58) Field of Classification Search
  None
  See application file for complete search history.

(56) References Cited

U.S. PATENT DOCUMENTS

| | | | |
|---|---|---|---|
| 4,885,473 A | 12/1989 | Shofner et al. | |
| 5,552,555 A | 9/1996 | Tsien et al. | |

(Continued)

FOREIGN PATENT DOCUMENTS

| | | |
|---|---|---|
| DE | 695 18 449 T2 | 2/2001 |
| EP | 1 544 600 A1 | 6/2005 |

(Continued)

OTHER PUBLICATIONS

Hering et al., "A Laminar-Flow, Water-Based Condensation Particle Counter (WCPC)," Aerosol Sci & Tech, vol. 39, No. 7, pp. 659-672 (Jul. 1, 2005).

*Primary Examiner* — Luke D Ratcliffe
(74) *Attorney, Agent, or Firm* — Muncy, Geissler, Olds & Lowe, P.C.

(57)            ABSTRACT

A method for determining a particle velocity of an aerosol by means of an aerosol measuring device. Aerosol particles flow through a measuring cell and are illuminated with an electromagnetic beam. The scattered light is registered and detected by a sensor. The temporal signal durations of the scattered light signals are determined, and the particle velocity of the aerosol is determined on the basis of the signal durations. Furthermore, the invention provides an aerosol measuring device designed to carry out the steps of the method according to the invention for determining the particle velocity of an aerosol. In addition, a computer program having program code means is provided, which computer program is configured to carry out the steps of the method according to the invention.

20 Claims, 6 Drawing Sheets

(56)                    References Cited

U.S. PATENT DOCUMENTS

| 2003/0142289 A1* | 7/2003 | Ortyn ................. G01N 15/1012 |
| | | 356/28 |
| 2010/0288921 A1 | 11/2010 | Wang et al. |
| 2012/0004865 A1* | 1/2012 | Porro ...................... G01S 17/58 |
| | | 356/28.5 |
| 2016/0238510 A1* | 8/2016 | Bachalo ............ G01N 15/0211 |
| 2016/0305872 A1* | 10/2016 | Kaye .................. G01N 15/0205 |
| 2020/0025665 A1 | 1/2020 | Trainer |

FOREIGN PATENT DOCUMENTS

| EP | 3 056 892 A1 | 8/2016 |
| EP | 3 081 920 A2 | 10/2016 |
| JP | 2000503405 A | 3/2000 |

* cited by examiner

METHOD AND AEROSOL MEASURING DEVICE FOR DETERMINING THE PARTICLE VELOCITY OF AN AEROSOL

This nonprovisional application is a continuation of International Application No. PCT/EP2021/057184, which was filed on Mar. 22, 2021, and which claims priority to German Patent Application No. 10 2020 001 876.9, which was filed in Germany on Mar. 23, 2020, and which are both herein incorporated by reference.

BACKGROUND OF THE INVENTION

Field of the Invention

The present invention relates to a method and an aerosol measuring device for determining a particle velocity of an aerosol.

Description of the Background Art

Methods are known from the prior art in which aerosol particles of the aerosol flowing through a measuring cell are illuminated with an electromagnetic beam in the measuring cell, scattered light is registered by a sensor and scattered light signals of the aerosol particles are detected. The particle velocity is an essential parameter for the characterization of the aerosol. However, determining the particle velocity of the aerosol requires additional, dedicated measuring devices. As a result, the known methods for determining the particle velocity are elaborate in terms of design and expensive. The same applies to the known aerosol measuring devices.

SUMMARY OF THE INVENTION

It is therefore an object of the present invention to eliminate the disadvantages of the prior art and developing a method, by means of which the particle velocity of the aerosol can be determined more easily. In device terms, the same applies to the known aerosol measuring devices.

In an exemplary embodiment, a method is provided that is characterized in that the temporal signal durations of the scattered light signals of the aerosol particles are determined, and the particle velocity of the aerosol is determined on the basis of the signal durations. In device terms, the problem is solved by an aerosol measuring device in that a processing unit is configured such that the temporal signal durations of the scattered light signals of the aerosol particles can be determined and the particle velocity of the aerosol can be determined on the basis of the signal durations. According to the invention, a computer program having program code means is provided which is configured to carry out the steps of a method according to the invention when the computer program is run on a computer or a corresponding computing unit.

The invention is based on the basic concept that the signal durations of the measured scattered signals correspond to the dwell times of the aerosol particles in the measuring cell. Based on this consideration, the particle velocity of the aerosol can be determined by determining the signal durations. This eliminates the need to provide additional measuring devices, such as flow meters, for determining the particle velocity of the aerosol. This makes it easier, in particular also in terms of design, to determine the particle velocity.

It is preferably provided that the determined signal durations of the scattered light signals are corrected in order to allow for a more precise determination of the particle velocity of the aerosol.

At least 10, preferably at least 100, particularly preferably at least 500 measurements of the scattered light signals can be carried out to correct the signal durations. At least one of the measurements is preferably carried out on one individual aerosol particle; in particular, all measurements are carried out on one individual aerosol particle, wherein the aerosol particles are able to flow individually through the measuring cell. This increases the accuracy of determining the signal durations. For example, the correction can be made by statistically evaluating the measurements. This evaluation corresponds in particular to a time-of-flight analysis of the aerosol particles.

The signal durations are corrected, for example, by means of a frequency distribution of the signal durations. In this case, each signal duration is assigned its respective frequency. Intervals of signal durations can be combined into groups, wherein a signal duration is preferably assigned to each group. The groups can be assigned to signaling measurement channels. Graphically, the frequency distribution corresponds, for example, to a histogram in which the signal durations are plotted against their respective frequency.

In order to improve the accuracy of the correction of the signal durations, the frequency distribution of the signal durations can be interpolated, preferably by means of, in particular, piecewise polynomial interpolation. For example, a spline interpolation is used, in particular a cubic spline interpolation, which allows for an improved correction of the signal durations.

At least one maximum, in particular a local maximum, of the frequency distribution can be determined in order to correct the signal durations. The maximum of the frequency distribution of the signal durations corresponds to those aerosol particles that flow directly through the measuring cell. Impact processes when traversing the measuring cell or an oblique path result in a scattering of the measured values for the signal durations. By determining the maximum of the frequency distribution, a more reliable statement about the actual particle velocity of the aerosol can be made. On the basis of the geometry of the measuring cell, a plurality of local maxima of the frequency distribution can be formed. Preferably, all local maxima of the frequency distribution are determined. Within the context of the invention, the local maximum corresponds to the maximum value of the frequency distribution within an, in particular, user-defined interval.

The particle sizes of the aerosol can be determined, for example, by the aerosol measuring device, and the signal durations can be corrected on the basis of the particle sizes of the aerosol. The particle size-dependent correction of the signal durations allows for a more precise determination of the particle velocity of the aerosol. For this purpose, for example, each particle size can be assigned a correction value, wherein the correction value corresponds to the particle size-dependent influence on the determined signal duration. Depending on the particle size, the signal duration determined for this purpose can be corrected in a particle size-dependent manner by calculation with the correction value. In particular, the frequency distribution of the signal durations can be corrected in a particle size-dependent manner. In a further embodiment, the determined signal durations are corrected on the basis of the material of the aerosol particles, which further improves the accuracy of the method. In this case, a correction value can be assigned to each material of the aerosol particles.

A statistical variance parameter can preferably be determined on the basis of the frequency distribution in order to characterize, for example, the deviation of the frequency distribution. The variance parameter is assigned, for example, to a local maximum of the frequency distribution. For this purpose, for example, the full width at half maximum (FWHM) of the at least one local maximum can be determined, which FWHM corresponds to the deviation of the frequency distribution by the local maximum.

The signal durations can be corrected on the basis of the geometry of the measuring cell. For example, if the aerosol enters the measuring cell at a first position, traverses the measuring cell, and exits it at a second position, the particle velocity of the aerosol can be determined from the determined temporal signal duration if the path covered within the measuring cell is known. The aerosol can traverses the measuring cell on at least two different paths. In this case, the frequency distribution has at least two local maxima. The number of determined signal durations corresponds to the number of possible paths along which the aerosol can flow through the measuring cell. Since the particle velocity of the aerosol must be the same regardless of the distance traveled through the measuring cell, the knowledge of the distances traveled through the measuring cell allows for the determined signal durations to be corrected in order to calculate the particle velocity of the aerosol.

The correction of the signal durations preferably comprises a constant which is, in particular, independent of the particle size of the aerosol. The constant corresponds, for example, to an offset value that is assigned to the aerosol measuring device and, in particular, is also independent of the particle velocity of the aerosol and/or the geometry of the measuring cell. The constant is a time value and lies, for example, within an interval between 2 µs and 10 µs, preferably between 4 µs and 6 µs.

In an advantageous embodiment of the invention, at least two signal durations, each of which assigned to a local maximum of the frequency distribution, are used to determine the constant. In particular, a quotient of two preferably corrected signal durations is used. In order to determine the constant, the dependency between the determined signal duration and the particle velocity is particularly preferably determined, in particular by means of a measurement using a flow meter.

Further steps can be taken to correct the signal durations, for example, by using signaling filters, such as high- and/or low-pass filters, or also filters for noise suppression.

The volume flow velocity of the aerosol is preferably determined from the determined particle velocity, for example, on the basis of its flow behavior within the measuring cell. In a further advantageous embodiment of the invention, the aerosol flows through the measuring cell as a laminar flow. The aerosol preferably flows through the measuring cell as a uniform flow, wherein, within the context of the invention, no appreciable acceleration of the aerosol occurs. In this case, the volume flow velocity of the aerosol corresponds to its particle velocity.

In device terms, the aerosol measuring device has in particular a display device, by means of which the particle velocity of the aerosol and/or a parameter assigned to the particle velocity of the aerosol can be output.

The processing unit is preferably configured such that it carries out the steps of at least one of the methods mentioned above. The electromagnetic beam can be formed as a preferably polychromatic light beam and/or as a laser beam.

The processing unit of the aerosol measuring device can be connected to a flow device, wherein the flow device is configured in particular to control the flow velocity and/or the particle velocity of the aerosol at a user-defined value. For this purpose, the value of the determined particle velocity of the aerosol is preferably transmitted to the flow device. For example, the flow device has at least one pump and/or one fan. The flow device is designed to generate an air flow that is in particular changeable.

The invention can provide that a section of the measuring cell has a polygonal, in particular quadriliteral, basic shape. The measuring cell can have at least one, preferably at least two, defined paths for the movement of the aerosol through the measuring cell in order to simplify the determination and/or the correction of the signal durations. In an advantageous embodiment of the invention, the measuring cell is designed to be cuboid. A section of the measuring cell can preferably have a T-shaped basic shape. This results, for example, in three paths for the aerosol, wherein a first path is longer than the remaining two paths, and the remaining two paths are of the same length.

The computer program according to the invention is preferably run on the control unit of the aerosol measuring device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
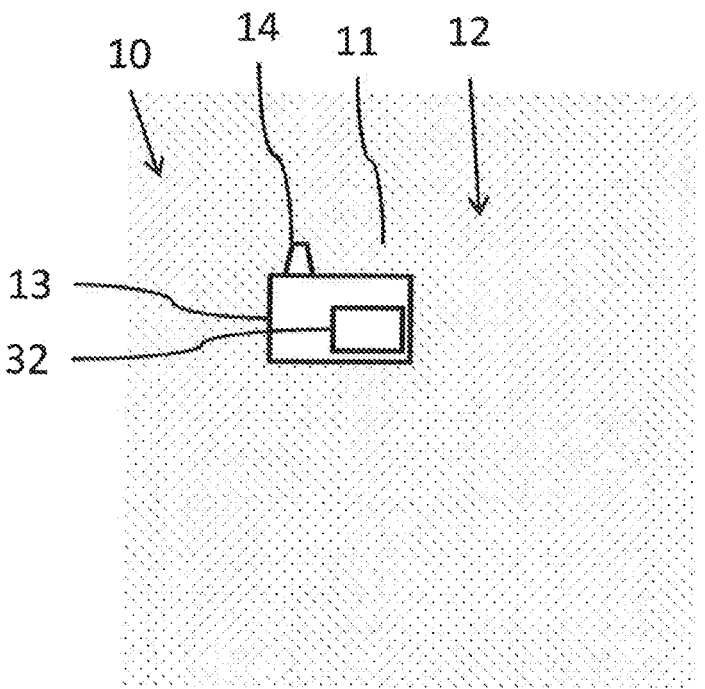
FIG. 1 shows a schematic representation of an aerosol measuring device according to the invention.

FIG. 1 shows a schematic representation of an aerosol 10 containing solid and liquid aerosol particles 11 in a gas 12, for example, air. Aerosol particles 11 are, for example, water droplets, soot particles, abraded material, pollen, and/or other organic and chemical substances.

Figure 2:
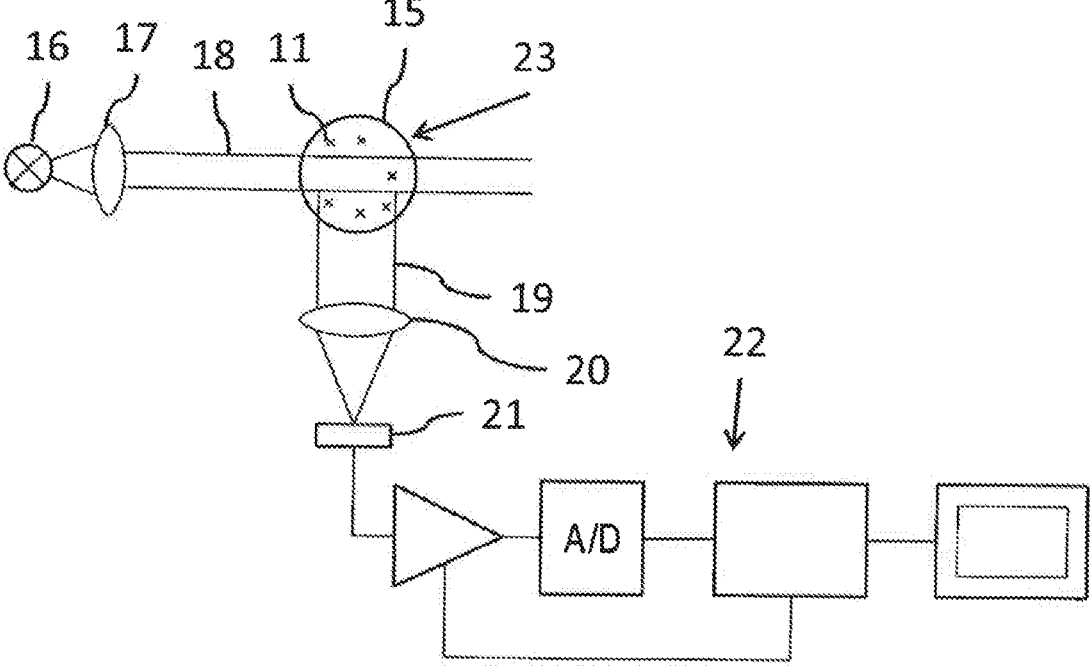
FIG. 2 shows a schematic structure of the aerosol measuring device.

An aerosol measuring device 13 in the form of an aerosol spectrometer is arranged in the region of the aerosol 10 and measures a particle size distribution $c_n$ of the aerosol particles 11 of the aerosol 10 on the basis of their particle diameters $d_p$. For this purpose, the aerosol particles 11 are suctioned through via an access opening 14 of the aerosol measuring device 13 and via a flow tube 15 by means of a flow device arranged downstream in the form of a pump device 32, wherein the pump device 32 is outlined in FIG. 1. In the outlined structure of the aerosol measuring device 13 according to FIG. 2, the flow tube 15 is arranged perpendicularly to the plane of the drawing.

The aerosol particles 11 are individually irradiated in the flow tube 15 perpendicularly to their flight direction with a collimated light beam 18 formed of polychromatic light from a light source 16 and a lens 17. Due to the thus occurring scattering processes, the aerosol particles 11 emit scattered light 19 which impinges on a converging lens 20 perpendicularly to the flight direction of the aerosol particles 11 and perpendicularly to the irradiation direction of the light from the light source 16. The converging lens 20 focuses the scattered light 19 onto an optoelectrical sensor 21 which detects the signals of the scattered light 19 and converts them into electrical signals. An electronic processing unit 22 uses the electrical signals to determine the particle size distribution $c_n$ on the basis of the particle diameters $d_p$ of the aerosol particles 11. The spatial overlap of the light beam 18, the measured scattered light 19, and the detected part of the aerosol particles 11 in the flow tube 15 define a virtual spatial measuring cell 23 in which the particle size distribution $c_n$ is determined. The flow of the aerosol 10 and thus also of the aerosol particles 11 in the region of the measuring cell 23 is laminar and uniform.

During the measurement, the light intensity of the scattered light 19, and thus also the resulting electrical signal strength, is a measure of the particle size of the aerosol particles 11, to which a particle diameter $d_p$ is assigned accordingly. As a result, the particle sizes of the aerosol particles 11 are determined.

Figure 3:
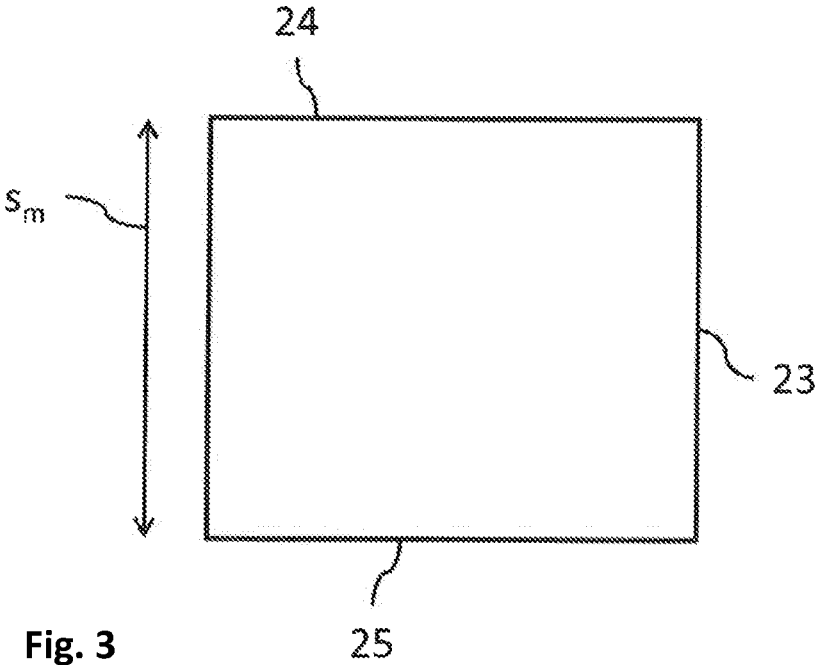
FIG. 3 shows a schematic section of a measuring cell with a rectangular basic shape.

FIG. 3 shows the measuring cell 23 in a cuboid configuration in a section having a rectangular basic shape. The aerosol particles 11 enter the measuring cell 23 individually at an upper region 24 and exit from said measuring cell at a lower region 25. As stated, the movement of the aerosol particles 11 corresponds to a laminar, uniform flow, so that there is essentially no acceleration and no deceleration of the aerosol particles 11 within the measuring cell 23. The velocity $v_p$ of the aerosol particles 11 is therefore constant for the duration of the movement through the measuring cell 23.

Figure 4:
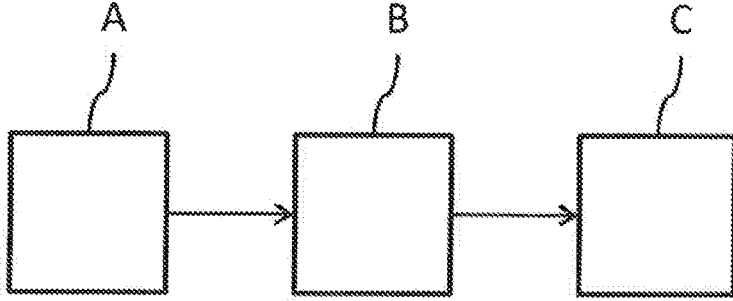
FIG. 4 shows a flowchart of a method according to the invention.

FIG. 4 shows a method according to the invention in a flowchart: For determining the particle velocity $v_p$ of the aerosol 11, a time-dependent detection A of the scattered light signals 19 of the aerosol particles 11 takes place. Within the context of the invention, the temporal duration of the scattered light signals 19 is referred to as the signal duration $t_s$. In a next step of the method, the particle velocity $v_p$ is calculated from the signal duration $t_s$ of the aerosol particles 13 as follows:

$$v_p = s_m / t_s,$$

wherein $s_m$ is the distance traveled through the measuring cell 23 between the upper region 24 and the lower region 25 and known from the geometric design of the measuring cell 23. The value of $s_m$ is stored in the processing unit 22. Each measurement for determining the signal duration $t_s$ is carried out on one individual aerosol particle 11.

The value of the particle velocity $v_p$ is output by a display device (not depicted) of the aerosol measuring device 13 C. Due to the laminar, uniform flow of the aerosol 10 in the measuring cell 23, the particle velocity $v_p$ corresponds approximately to its flow velocity $v_a$ which is output by the display device.

Figures 5, 6:
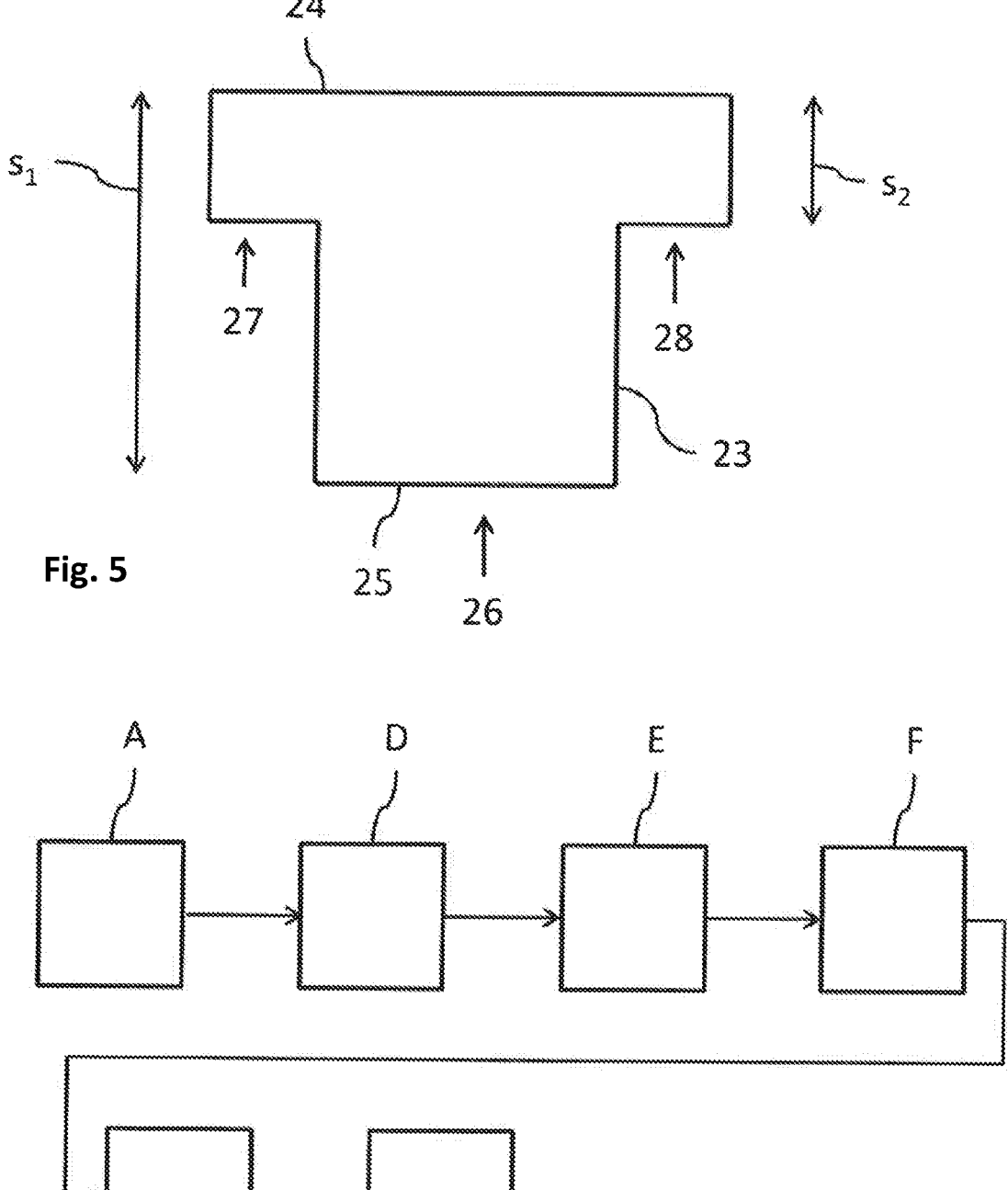
FIG. 5 shows a schematic section of a measuring cell with a T-shaped basic shape.
FIG. 6 shows a further embodiment of the method according to the invention in a flowchart.

FIG. 5 shows a further embodiment of the measuring cell 23, the section of which has a T-shaped base surface. The measuring cell 23 has a first centered region 26 that is longer in the vertical direction, wherein a second, vertically shortened region 27 is arranged to the left of the first region 26 and a third, vertically shortened region 28 is arranged to the right of the first region 26. The distance $s_1$ corresponds to a movement of the aerosol particles 11 through the first region 26 and the distance $s_2$ corresponds to the flow movement of the aerosol particles 11 through the second region 27 or through the third region 28.

FIG. 6 shows a further embodiment of the method according to the invention for determining the particle velocity $v_p$, which method begins with the above-described step A, the detection of the signal durations $t_s$. For determining the particle velocity $v_p$ more precisely, the signal duration $t_s$ is subsequently corrected: After the signal duration $t_s$ has been determined, the measurement is continued for this purpose in a next method step D, and a total of 500 measurements are carried out, the signal durations $t_s$ of which are stored. Once again, each measurement is carried out on one individual aerosol particle 11.

In a next method step, a frequency distribution of the signal durations is created E: The signal durations $t_s$ are plotted against their respective frequency in a histogram 29 which is shown by way of example in FIG. 7. Due to signaling conditions, the signal durations $t_s$ in the embodiment shown are combined into measurement channels at intervals of 0.54 μs each. This results in the histogram 29 in the form of a bar chart with two local maxima 30, 31. In this case, the right-hand maximum 30 corresponds to a movement of the aerosol particles 11 through the first region 26 of the measuring cell 23 and the left-hand maximum 31 corresponds to a movement of the aerosol particles 11 through its second region 27 or its third region 28.

In a further method step, a particle size-dependent correction F of the determined signal durations $t_s$ takes place. Experiments have shown that different signal durations $t_s$ are measured for different particle diameters $d_p$, which contradicts the fact that all aerosol particles 11 move at the same particle velocity $v_p$ in a laminar and uniform flow of the aerosol 10. The influence of the particle size on the determined signal durations $t_s$ is taken into account by the following correction F.

Figure 7:
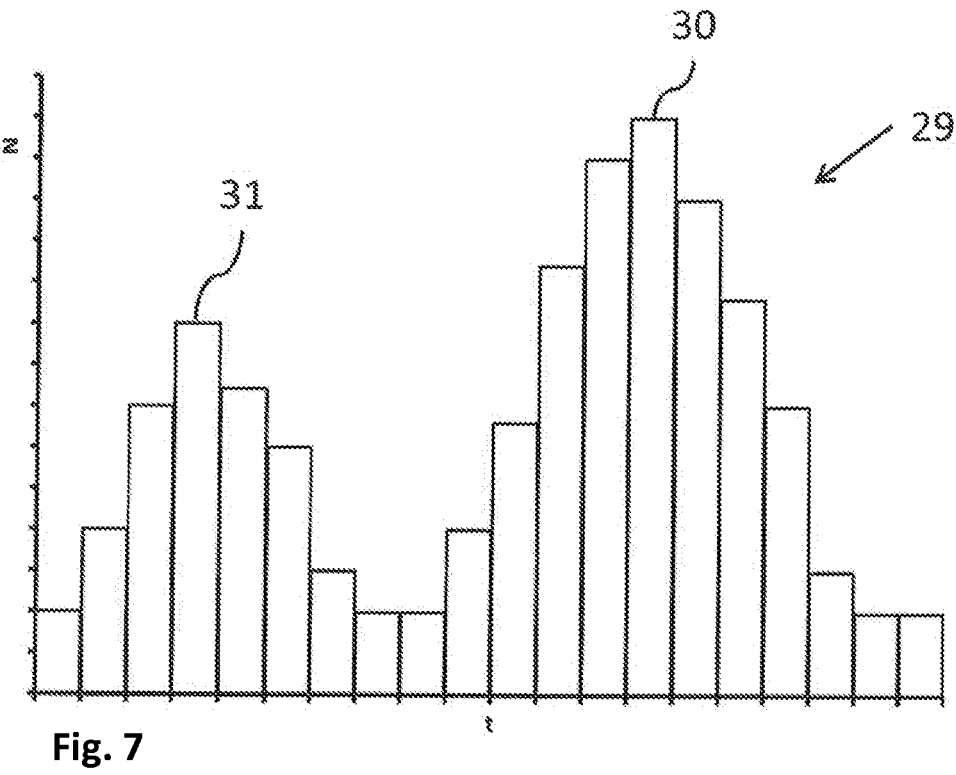
FIG. 7 shows a frequency distribution of signal durations.
Figure 8:
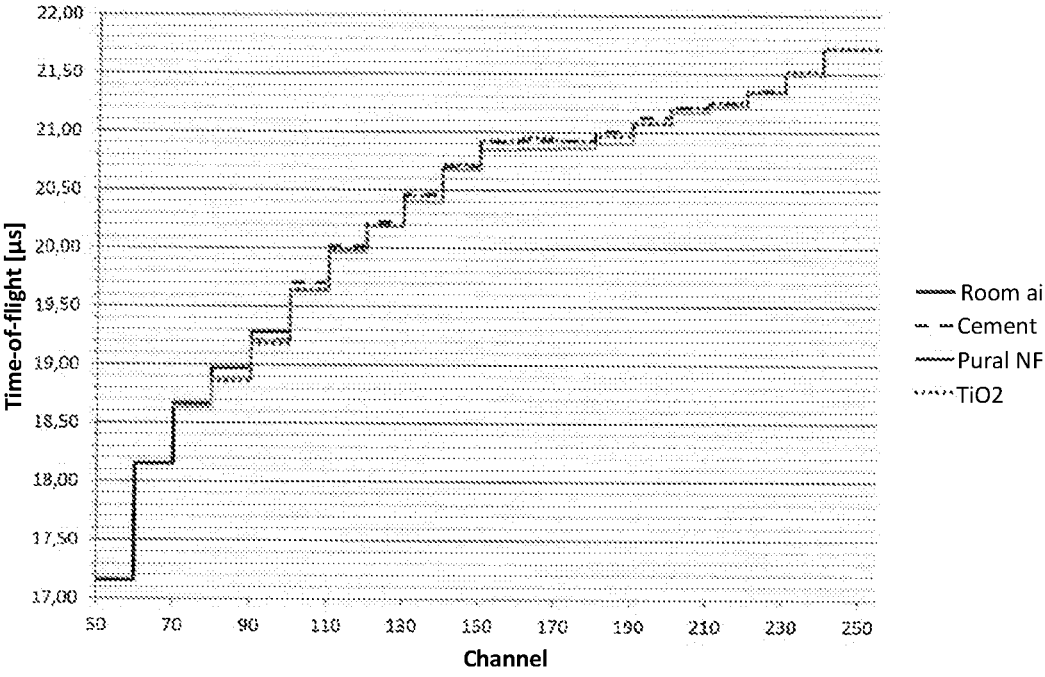
FIG. 8 shows a particle size-dependent distribution of signal durations.

For compensating this influence, the associated signal durations $t_s$ are first determined for different particle sizes of aerosol particles 11 according to the method explained above, wherein, due to signaling conditions, intervals of particle sizes are combined into channels, similar to the creation of the histogram 29 according to FIG. 7. A mean value for the determined signal duration $t_s$ is assigned to each channel. FIG. 8 shows the behavior of the signal durations on the basis of the particle size for room air (black line), cement (dashed line), a standard dust (grey line), and titanium dioxide ($TiO_2$, dotted line), wherein, in the following, the curve for the standard dust below is considered; see FIG. 9.

Figure 9:
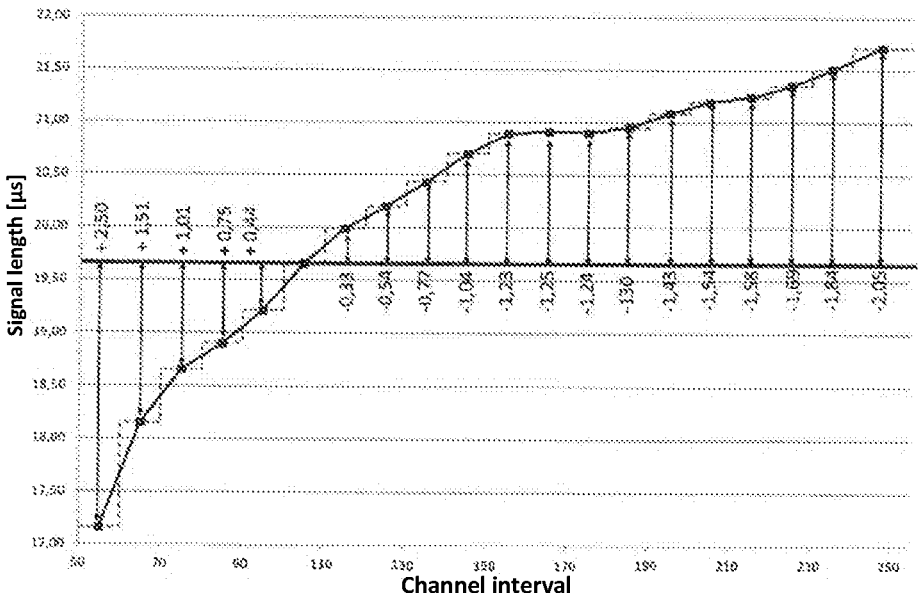
FIG. 9 shows an interpolated distribution of FIG. 8.

The signal duration $t_s$ of a channel is determined as a reference value. In the embodiment shown in FIG. 9, channel 110 is selected as the reference channel; the corresponding reference value of the signal duration $t_s$ is approximately 19.65 us and is shown in FIG. 9 as a horizontal line. The difference values $\Delta t$ between the signal durations $t_s$ and the reference value are determined for the other channels. The difference values $\Delta t$ are reproduced in FIG. 9 and assigned to the corresponding channels of the particle sizes. The difference value $\Delta t$ assigned to a particle size thus corresponds to the signal duration $t_s$ in the form of a correction value for the particle-dependent correction. The difference values $\Delta t$ can be determined more precisely by interpolation. For the particle size-dependent correction of the determined signal durations $t_s$, they are offset against the correction value $\Delta t$ assigned to the particle size.

Figure 10:
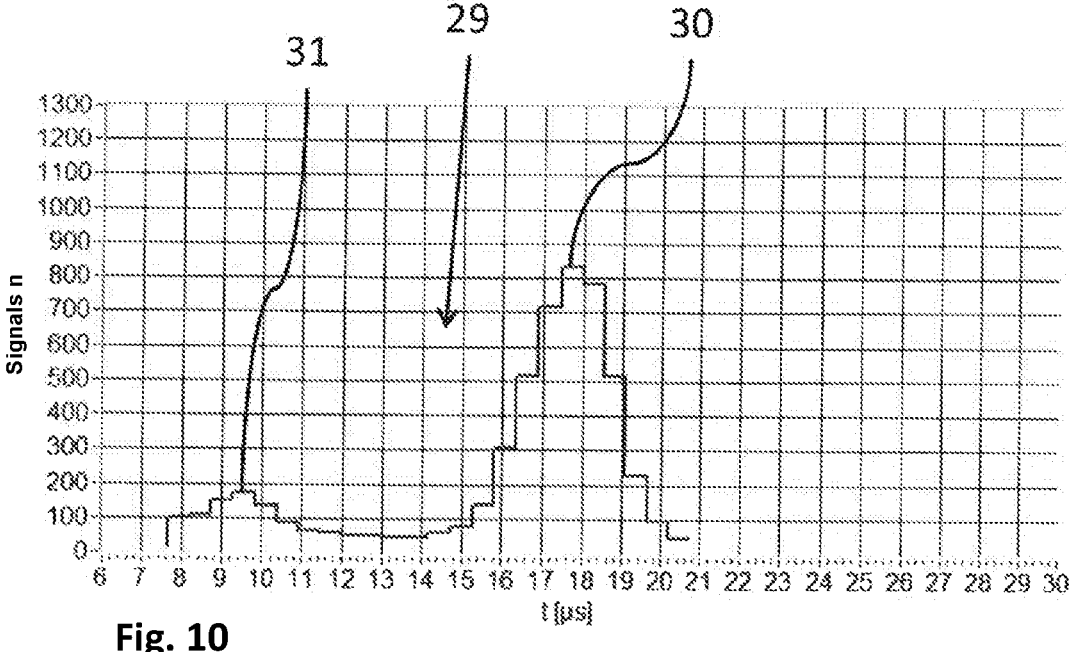
FIG. 10 shows a further frequency distribution of signal durations in a histogram.
Figure 11:
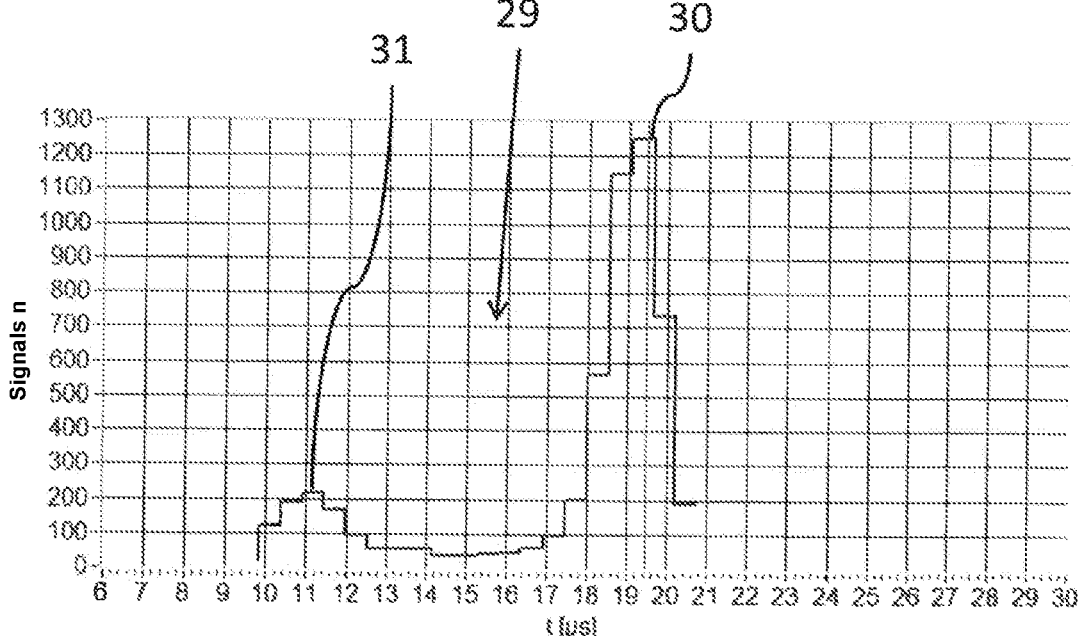
FIG. 11 shows the histogram of FIG. 10 after particle size-dependent correction.

In a histogram 29, FIG. 10 shows a further frequency distribution of determined signal durations $t_s$, wherein a particle size-dependent correction has not yet taken place. FIG. 11 shows the histogram 29 of FIG. 10 after the correction has taken place. A comparison between the uncorrected histogram in FIG. 10 and the corrected histogram in FIG. 11 makes it clear that the maxima 30, 31 in the corrected histogram in FIG. 11 are larger and narrower than in FIG. 10. The particle size-dependent correction of the determined signal durations $t_s$ thus allows for a more accurate determination of the maxima 30, 31 and thus for a more accurate determination of the particle velocity $v_p$.

In order to determine the quality of the measurement and the particle size-dependent correction, the full width at half maximum (FWHM) assigned to the right-hand maximum 30 is calculated, which FWHM corresponds to a statistical variance parameter. In comparison with the uncorrected histogram in FIG. 10, the corrected histogram in FIG. 10 has a smaller full width at half maximum, in particular for the right-hand maximum 30.

In a further step of the method according to FIG. 6, the signal durations $t_s$ are corrected by a constant $t_0$, which in particular is independent of the particle size and the particle velocity $v_p$ and in this respect corresponds to an influence of the 0th order. The following applies to the determined signal duration $t_s$:

$$t_s = t_w + t_0,$$

wherein $t_w$ corresponds to the actual signal duration. By determining the particle velocity $v_p$ of an aerosol 10 using a flow meter (not depicted), the constant $t_0$ can be determined as follows:

$$t_0 = s/v_p - t_w$$

The value of the constant $t_0$ is stored in the aerosol measuring device 13, and the flow meter is no longer required for the following measurements.

After the corrections mentioned above have been carried out, the particle velocity $v_p$ is output via the display device in the last step C, as already described. Due to the flow behavior of the aerosol 10, its flow speed $v_a$ corresponds to the particle velocity $v_p$.

The determined particle velocity $v_p$ of the aerosol 10 is transmitted to the pump device 32 of the aerosol measuring device 13, which controls the particle velocity $v_p$ of the aerosol at a user-defined value.

The method according to the invention is carried out by running a corresponding computer program on the processing unit 22 of the aerosol measuring device 13.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to determine a particle velocity of an aerosol via an aerosol measuring device, the method comprising:
   illuminating aerosol particles of the aerosol flowing through a measuring cell with an electromagnetic beam in the measuring cell;
   registering scattered light signals by a sensor;
   detecting scattered light signals of the aerosol particles;
   determining temporal signal durations of the scattered light signals of the aerosol particles;
   determining the particle velocity of the aerosol based on the temporal signal durations; and
   correcting the temporal signal durations of the scattered light signals via a frequency distribution of the temporal signal durations.

2. The method according to claim 1, wherein at least 10 measurements of the scattered light signals are carried out to correct the signal durations and/or wherein at least one of the measurements is carried out on one individual aerosol particle.

3. The method according to claim 1, wherein the signal durations are corrected via an interpolation or via an interpolation of the frequency distribution.

4. The method according to claim 3, wherein at least one local maximum of the frequency distribution is determined in order to correct the signal durations.

5. The method according to claim 1, wherein the particle sizes of the aerosol are determined by the aerosol measuring device, and the signal durations are corrected on the basis of the particle sizes of the aerosol, wherein a correction value is assigned to each particle size of the aerosol for the particle size-dependent correction of the signal durations.

6. The method according to claim 3, wherein a variance parameter assigned to the at least one local maximum of the frequency distribution is determined on the basis of the frequency distribution.

7. The method according to claim 1, wherein the signal durations are corrected on the basis of the geometry of the measuring cell.

8. The method according to claim 1, wherein the correction of the signal durations comprises a constant that is independent of the particle size of the aerosol, and wherein, to determine the constant, at least two determined signal durations are used, which are each assigned to a local maximum of the frequency distribution.

9. The method according to claim 8, wherein, to determine the constant, a dependency between the signal duration and the particle velocity is determined via a measurement using a flow meter.

10. The method according to claim 1, wherein a flow speed of the aerosol is determined from the determined particle speed.

11. The method according to claim 1, wherein the aerosol flows as a laminar flow and/or uniformly through the measuring cell.

12. An aerosol measuring device for determining a particle velocity of an aerosol, comprising:
   a measuring cell, the aerosol particles being arranged in the measuring cell such that the aerosol particles are adapted to be illuminated by an electromagnetic beam;
   a sensor for registering scattered light signals from the aerosol particles and for detecting scattered light signals from the aerosol particles; and a processor configured such that the temporal signal durations of the scattered light signals of the aerosol particles are determined, and to determine the particle velocity of the aerosol based on the signal durations, wherein the temporal signal durations of the scattered light signals are corrected via a frequency distribution of the temporal signal durations.

13. The aerosol measuring device according to claim 12, wherein the processor is configured such that it carries out the steps of a method comprising:

illuminating aerosol particles of the aerosol flowing through a measuring cell with an electromagnetic beam in the measuring cell;

registering scattered light by a sensor;

detecting scattered light signals of the aerosol particles;

determining temporal signal durations of the scattered light signals of the aerosol particles; and determining the particle velocity of the aerosol based on the temporal signal durations.

14. The aerosol measuring device according to claim 12, wherein the electromagnetic beam is formed as a polychromatic light beam.

15. The aerosol measuring device according to claim 12, wherein the processor is connected to a flow device that is configured to control the particle velocity of the aerosol at a user-defined value.

16. The aerosol measuring device according to claim 12, wherein a section of the measuring cell has a polygonal, a quadrilateral, or a T-shaped basic shape.

17. A non-transitory, computer-readable storage medium containing a computer program having program code, which computer program is configured to carry out the steps of the method according to claim 1 when the computer program is run on a computer or a corresponding computing unit or a processor of an aerosol measuring device.

18. The method according to claim 1, wherein at least 500 measurements of the scattered light signals are carried out to correct the signal durations and/or wherein at least one of the measurements is carried out on one individual aerosol particle.

19. The method according to claim 1, wherein said frequency distribution comprises how often a specific signal duration, or an interval of signal durations, is determined.

20. The method according to claim 1, wherein the frequency distribution defines a number of how often the temporal signal durations are measured.

\* \* \* \* \*